Aug. 14, 1945.　　　E. S. PURINGTON　　　2,382,097

SELECTIVE CONTROL CIRCUIT

Filed Aug. 26, 1942　　　2 Sheets-Sheet 1

INVENTOR
ELLISON S. PURINGTON
BY H. S. Grover
ATTORNEY

Aug. 14, 1945.   E. S. PURINGTON   2,382,097
SELECTIVE CONTROL CIRCUIT
Filed Aug. 26, 1942   2 Sheets-Sheet 2
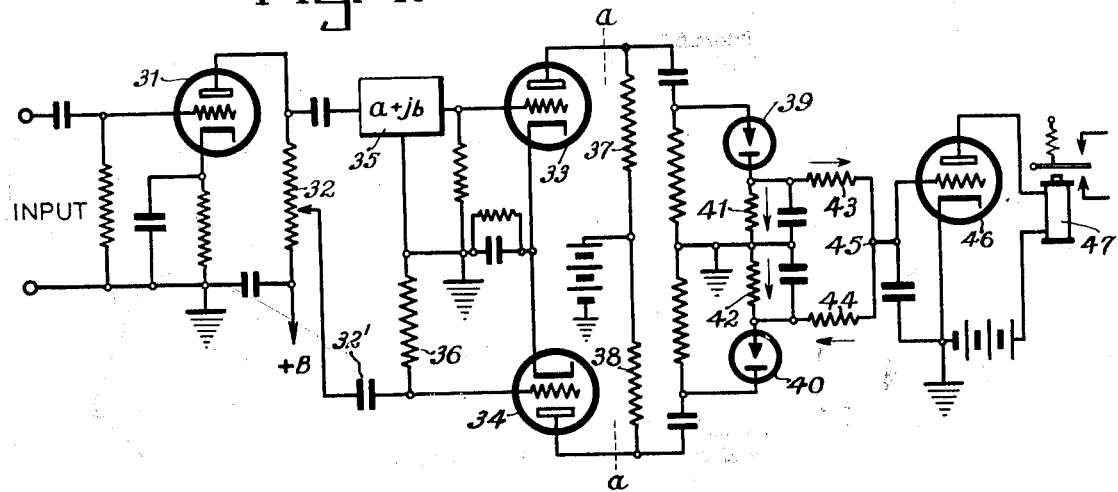
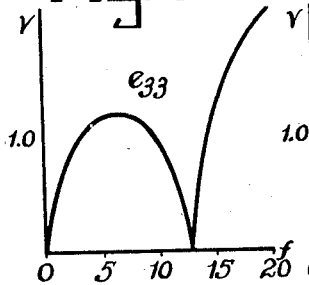
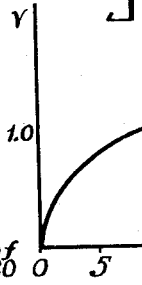
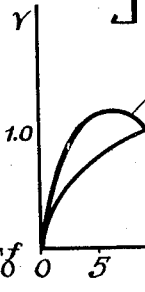
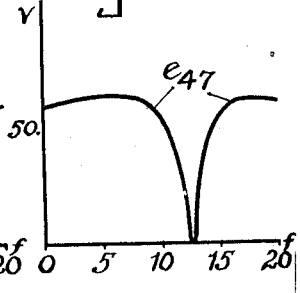
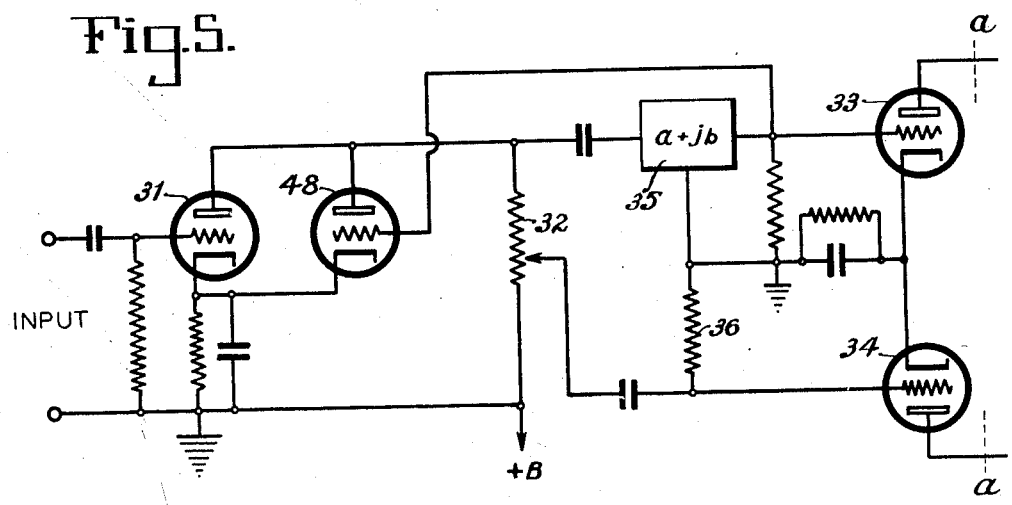
INVENTOR
ELLISON S. PURINGTON
BY H. G. Grover
ATTORNEY Patented Aug. 14, 1945

2,382,097

UNITED STATES PATENT OFFICE 2,382,097

SELECTIVE CONTROL CIRCUIT

Ellison S. Purington, Gloucester, Mass., assignor, by mesne assignments, to Radio Corporation of America, New York, N. Y., a corporation of Delaware Application August 26, 1942, Serial No. 456,285

14 Claims. (Cl. 171—97)

In control circuits it is sometimes required to cause a relay to operate in response to a control signal of a given frequency, and not to operate in response to signals of equal or greater strength somewhat different from the desired frequency. The usual practice is to use a circuit selectively responsive to the desired control frequency, to produce a direct current or change of direct current in accordance with the energy transmitted through the selective circuit, and to control the relay in accordance with the direct current.

It has been found very difficult to produce an electrically tuned circuit highly selective to the passage of low frequencies, say in the order of 12 cycles. But it has been found relatively simple to produce an electrical circuit highly selective against the transmission of such currents. Such a circuit is described and claimed in my copending application, Serial No. 456,286 filed August 26, 1942.

The present invention has for its purpose the controlling of a relay in accordance with the presence of energy of a certain frequency by use of a circuit highly selective against the passage of energy of the required frequency, and selective in favor of the passage of energy of the undesired frequencies.

Figure 1:
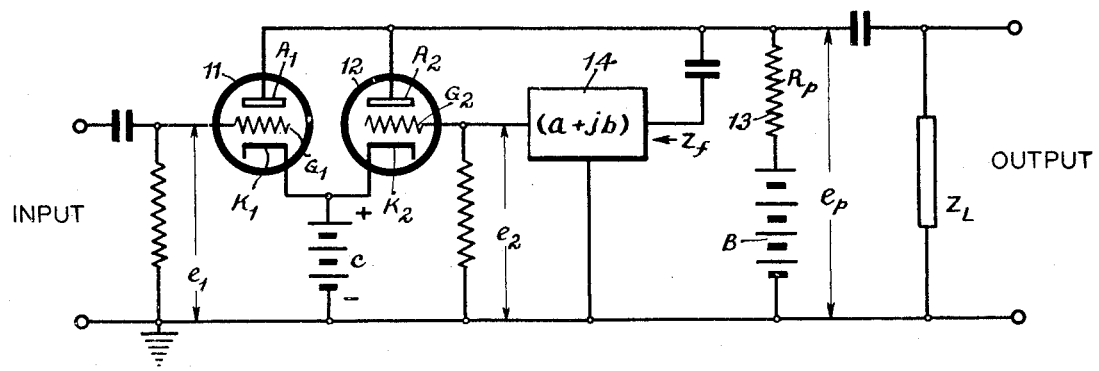
Figure 2:
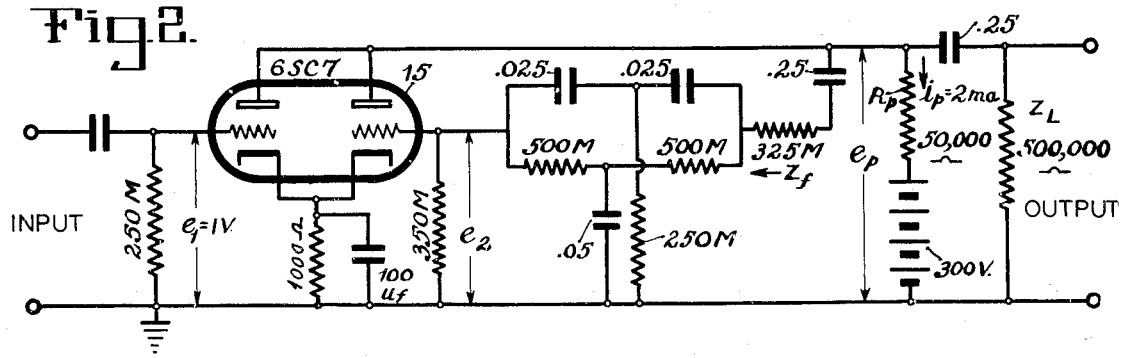
Figure 3:
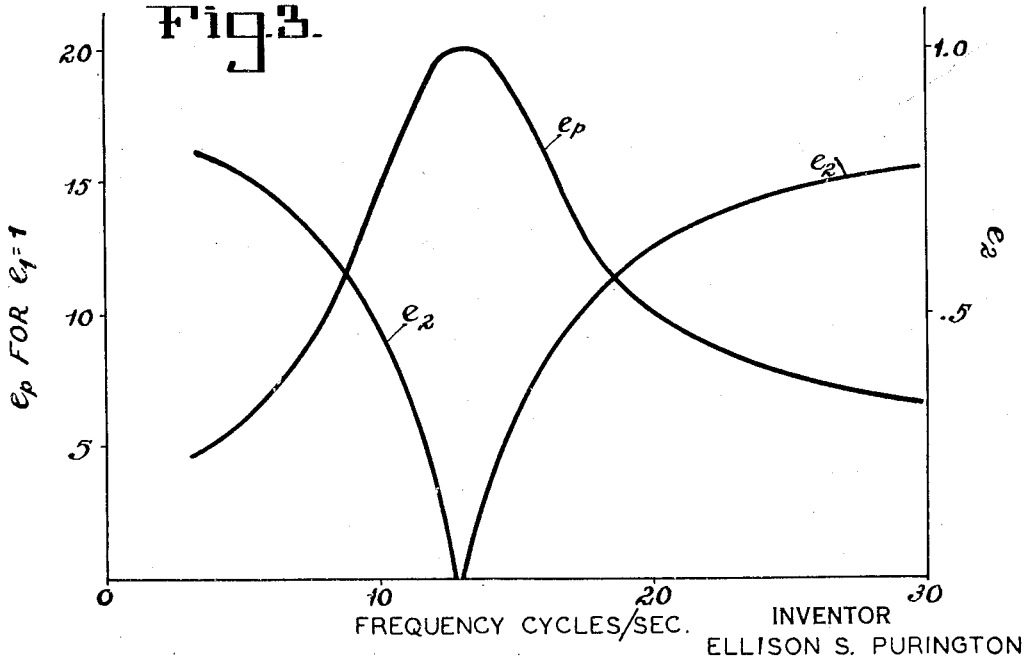

For a clear understanding of the invention reference will be made to the accompanying drawings in which Figure 1 discloses the general system according to the invention; Figure 2 is a practical embodiment of the circuit; Figure 3 are curves serving to explain certain aspects of the invention; Figure 4 discloses an embodiment of the invention in which it is desired to operate a relay by a low frequency signal; Figures 4A to 4D are curves depicting voltage characteristics at various portions of the circuit in Figure 4, and Figure 5 is a modification combining certain of the features of Figures 2 and 4.

One method which may be employed is by altering the transfer of energy through an amplifier by the utilization of regeneration or degeneration. Such an arrangement is shown in Figure 1 in which tubes 11 and 12 are connected with their plates $A_1$ and $A_2$ in parallel, fed by a common plate resistor 13 from the plate power source B. The cathodes $K_1$ and $K_2$ of the tubes 11 and 12 may be polarized positive by a battery C, or by the resistor-capacity method, as in Figure 2, or any other method. The signal voltage $e_1$ is impressed upon the grid $G_1$ of the tube 11, and the grid $G_2$ of the tube 12 is energized with a voltage $e_2$ derived from the common plate circuit, fed through a transmission network 14. The characteristic of this transmission network may be given by the ratio of the voltage $e_2$ between the grid $G_2$ of the tube 12 and ground, to the A. C. voltage $e_p$ of the plates to ground. This ratio is the vector quantity $(a+jb)$ where $a$ and $b$ vary with frequency. The useful load may be derived from the plate circuit of the tube, in which there are included the three impedances: $R_p$, the plate resistor, $Z_f$, the input impedance of the feedback circuit, and $Z_L$, the impedance of the load circuit. In practice $Z_f$ and $Z_L$ will be high compared with $R_p$ and it will not be much in error if the external impedance of the plate circuit is considered to be merely $R_p$. For more exact purposes the external plate impedance is $Z_p$ which is the impedance of $R_p$, $Z_f$ and $Z_L$ all in parallel.

If the system is operated in linear regions with two identical tubes, each characterized by an amplication factor $\mu$ and an internal impedance $R_o$, and if all other sources of transfer of energy between the plate and grid of the tubes are neglected, it is readily established that the A. C. plate voltage with respect to ground is related to the two grid voltages $e_1$ and $e_2$ with respect to ground by the equation:

$$e_p = \frac{-\mu(e_1+e_2)}{\left(2+\dfrac{R_o}{Z_p}\right)}$$

But the voltage $e_2$ is related to $e_p$ by $$e_2 = e_p(a+jb)$$

Whence $$e_p = \frac{-\mu e_1}{\left[2+\dfrac{R_o}{Z_p}+\mu a+j\mu b\right]}$$

The effect of the presence of the feedback circuit may be stated by the ratio of the plate voltage with the network absent to the plate voltage with the network present, which is feedback insertion ratio:

$$1+\left[\left(\frac{\mu}{2+\dfrac{R_o}{Z_p}}\right)(a+jb)\right]$$

This is, of course, unity if $a$ and $b$ are both zero. If $Z_p$ is assumed to be a pure resistance, then the feedback insertion ratio is greater than unity when $a$ is positive, in which case the feedback is degenerative. If $a$ is negative, the ratio may be less than unity and the feedback regenerative.

For a concrete example, there is shown in Figure 2 a practical circuit in which the two triodes are constituted by the twin triode amplifier tube 15 known as the 6SC7, operated with $R_p=50{,}000$ ohms, a plate supply of 300 volts, cathode resistor 1000 ohms suitably bypassed by 100 $\mu f$. for example, with 2 ma. flowing in the plate circuit producing 2 volts bias. For the operation point $\mu=70$ and $R_o=75{,}000$ ohms approximately. Assume $Z_t$ and $Z_L$ are so high that $Z_p=R_p=50{,}000$ ohms. Then the insertion ratio and the insertion loss in decibels are:

Feedback insertion ratio $=1+20a+j(20b)$
Insertion loss $d\ b=10\ \log_{10}(1+40a+400a^2+400b^2)$ For the feedback circuit, the network of the above copending application may be used for example, under the condition that $h=\sqrt{2}$, $p=o$, and $s=o$. For this circuit, as set up in Figure 2 for $F_0=12.75$, $a$ and $b$ are very closely $$a=\left(\frac{.207y^2}{8+y^2}\right) b=\left(\frac{.575y}{8+y^2}\right) \text{ where } y=\left(x-\frac{1}{x}\right)$$

where $x=$ratio of any frequency to the reference frequency $F_0$.

The transmission through the network is zero for the frequency of 12.75 cycles, and $a$ is positive for all other frequencies, so that the system is degenerative, the presence of the feedback circuit causing a reduction of the gain for all frequencies except 12.75 cycles. For reference assume that 1 volt A. C. at different frequencies is impressed upon the grid of the first triode section of tube 15. Then the voltages $e_p$ across the plate resistor and the voltages $e_2$ impressed through the feedback circuit on the grid of the second triode section are as shown in Figure 3.

One defect of degenerative feedback for selectivity purposes is that under certain conditions the effect may be regeneration. For example, if the network 14 of Figure 1 were made up by two of the circuits shown, with a vacuum tube between them giving a phase reversal, then the voltage $e_2$ would be approximately $$e_2=k(a+jb)(a+jb)e_p$$

where K depends upon the amplification of the added tube. Therefore, $$e_2=k[(b^2-a^2)+j2ab]$$

and the feedback is capable of being regenerative, if $a>b$. However with the circuit shown, the performance is stable and no indication of tendency to oscillate exists.

Whenever the signal is desired to operate a relay, by producing direct current voltage, using a circuit which does not pass the frequency by which control is to be exercised, the circuit and method of Figure 4 may be used. Here the signal is impressed upon the input of an amplifier tube 31, provided with an output impedance 32 which may consist of a fixed resistor. The amplified plate voltage is fed directly through network 35 with transmission characteristics $(a+jb)$ to a rectifier driver tube 33. The network 35 may be so designed as explained above as to exclude the passage of energy of the frequency which it is desired to operate the relay. Also, from a tap on the plate impedance 32, energy is fed through a blocking condenser 32' to a rectifier driver tube 34. This channel transmits the desired frequency and also other frequencies.

Now tube 33 drives rectifier 39, while tube 34 drives rectifier 40. These may be copper oxide or electronic rectifiers. They are so connected that rectifier 39 tends to establish point 45 of the rectifier output network positive with respect to ground and rectifier 40 tends to establish point 45 negative with respect to ground. It will be found that the voltage of point 45 with respect to ground is proportional to the difference of the effective voltages impressed on 33 and on 34, and independent of any phase relationship.

As an illustrative example, with the transmission circuit as in the previous Figure 2, the network 35 may be arranged not to transmit energy of a frequency of 12.75 cycles. For this frequency energy is transmitted from the tap on the potentiometer to tube 34. While rectifier 39 is not excited by the desired frequency of operation, and no rectified current flows through the output resistor 41, the rectifier 40 is excited by energy derived from 34, resulting in current flowing in resistor 42. With resistors 43 and 44 equal and of high value, the point 45 is therefore negative with respect to ground by an amount equal to half the voltage output of rectifier 40.

For any other frequency, both rectifiers are operative and point 45 is at a potential which is the algebraic mean of the voltages produced by both rectifiers, being at ground potential when the two outputs are equal. With symmetrical tubes and tube circuits, this will occur when the transmission from the tube 31 to 33 is the same as the transmission from tube 31 to 34, on a numerical basis, independent of any phase relationship. For example, assume the potentiometer tap on 32 so adjusted that at the frequency 12.75 cycles, which the network 35 does not transmit, the succeeding circuits are operating in a linear manner with sufficient output to reduce the plate current of control tube 46 to zero. Then if the frequency of the input is varied, the transmission to 33 and 34 may be equal say at 10 and at 16 cycles. For frequencies lower than 10 cycles or above 16, the output of the rectifier 39 will exceed that of rectifier 40, and 45 become somewhat positive. But under these conditions the tube 46 operates as a self limiter, due to grid current drawn by the resistors in the grid circuit, so that the plate current of 46 is substantially the same as for frequencies 10 or 16 cycles.

These effects are summarized in Figures 4A to 4D. Assume there is a voltage of fixed amount but variable frequency impressed upon the input of the system. Fig. 4A shows the voltage to tube 33, and Fig. 4B the voltage to tube 34, both as functions of frequency. These curves indicate zero voltage at zero frequency because of the finiteness of the blocking condenser. Both curves are shown together in Fig. 4C, showing equal transmission from the source at zero, 10 and 16 cycles, with $e_{33}$ greater outside the range between 10 and 16 cycles. With equal rectifier efficiency on both channels, the voltage across the relay will be as in Fig. 4D, with 50 volts at zero, 10 and 16 cycles, slightly more outside the range 10–16 cycles, and zero volts at 12.75 cycles. With a relay which is adjusted to close, for example, at 40 volts and drop out at 20 volts, it is seen that the relay will operate only within one or two cycles of the nominal operating value. It is understood that condensers bypassing the output resistors 41 and 42, and from the grid of tube 46 to ground may be chosen as large as practicable so that relay response results only after several cycles of the control frequency.

It will be understood that the transmission from tubes 31 to 34 need not have a rising frequency characteristic as indicated, but that it may be given a slightly falling characteristic in the vicinity of 12.75 (as by a condenser shunting resistor 36) so that for example equal transmission occurs at 9.75 and 15.75 cycles, both differing from the frequency of operation, 12.75 cycles, by the same amount on a frequency basis.

It will be understood also, that by making the potentiometer setting on resistor 32 so as to reduce the voltage transfer from 31 to 34 without modifying the transmission from 31 to 33, the frequencies for equal transmission may be closer together, say at 11.75 and 13.75 cycles, so that the plate current of control tube 46 varies only in the frequency range one cycle below to one cycle above the desired frequency of operation. Since by precision adjustment of the network 35, the transmission can be zero for one frequency, and finite for all others, there is no theoretical limit to the smallness of the difference of the two frequencies for equal transmission.

As a practical matter, however, it is well to provide the system with some degree of selectivity by making the plate voltage across impedance 32 a maximum for the desired frequency of transmission, strengths of input being of course the same for all frequencies. Such selectivity will not alter the frequency at which the transmission to tubes 33 and 34 are equal, but will serve to reduce the influence of powerful strays outside the band of interest, and also will sharpen the performance in such band.

One method which is simple and easily accomplished makes the same transmission network serve in Figure 4 and as in Figure 2. That is, a single transmission network which does not transmit energy of the desired frequency of operation can serve as a feedback circuit, to produce selectivity by the negative feedback method, and also at the same time as a discriminating circuit in the selective rectifier arrangement. A circuit combining both these methods is shown in Figure 5, the portion of the circuit to the right of line a—a, being the same as that to the right of the line a—a of Figure 4. It is produced from Figure 4 merely by using another tube 48, the plate and cathode of which are in parallel respectively with those of tube 31, but with the grid of tube 48 in parallel with the grid of tube 33. Structurally it differs from the circuit of Figure 4 only by the inclusion of an added triode which makes the voltage developed across the plate resistor 32 greatest for the frequency at which the network 35 does not transmit. By combining these methods, a high degree of selectivity is obtained in the control of the relay by the desired frequency, and in the lack of control by undesired frequencies.

It will be understood that added amplification may be included, with or without added discriminating circuits. For example, the performance of Fig. 4 or 5 as to amount of relay control voltage and as to the degree of sharpness could be increased by an added amplifier with a circuit similar to or duplicating network 35 interposed between tube 33 and rectifier 39.

Although the several tubes shown in Figs. 4 and 5 are indicated as triodes, it will be obvious to those skilled in the art that the invention may be practiced also with multiple grid tubes, and that the twin-triode 15 of Fig. 2 and the two triodes 31, 48 of Fig. 5 may be constituted by a tube having a single plate and two negatively biased signal control grids.

Various other modifications may be made in the invention without departing from the spirit and scope thereof, and it is desired therefore, that only such limitations shall be placed thereon as are necessitated by the prior art and set forth in the appended claims.

What I claim is:

1. A selective amplifier stage comprising two electron amplifier tubes with their plates and cathodes operatively connected in parallel, and with a common output circuit, means for connecting the grid of only one of the tubes to a source of energy to be selectively amplified, and means for degeneratively connecting only the grid of the other tube to the common output circuit of both tubes except at the frequency to be selectively amplified, and operatively disconnected at said frequency to be selectively amplified.

2. A selective amplifier stage comprising two electron amplifier units with their plates and cathodes operatively connected in parallel, and the grid of one operatively connected to a source of energy to be selectively amplified, a common substantially resistance load for both units, and a transmission circuit connected between the plates of both units and the other grid, the ratio of the grid voltage to the plate voltage being $(a+jb)$ where $a$ and $b$ are both zero for the frequency desired to be most strongly amplified.

3. A system for the production of selectivity in favor of energy of a specified frequency and discriminating against energy of other frequencies, comprising two amplifier tubes with their plates and cathodes operatively connected in parallel, with the grid of one of the tubes connected to the energy source, and with grid of the other tube coupled to the plates of both tubes except at said specified frequency.

4. A system for the selective control of a device at a desired frequency, comprising a tube upon the input of which there is impressed a band of frequencies including the desired frequency, a second tube having its space current path between anode and cathode connected to that of the first tube, an impedance included in the common anode to cathode circuit of said tubes, and an electrical network interconnected between said anode circuit and the control grid of the second tube, said network having the characteristic of discriminating against the passage of energy of said desired frequency.

5. A system for the selective control of a device at a desired frequency, comprising a tube upon the input of which there is impressed a band of frequencies including the desired frequency, first and second channels coupled to the output of said tube, an electrical network included in one of the channels having the characteristic of discriminating against the passage of energy of said desired frequency, the other channel being adapted to transmit the entire band of frequencies, a rectifier in each channel, and a control circuit coupled to the rectifier outputs which are connected so that they produce opposing effects on the control circuit.

6. A system for the selective control of a device at a desired frequency, comprising a tube upon the input of which there is impressed a band of frequencies including the desired frequency, an electrical network coupled to the output of said tube, said network having the characteristic of discriminating against the passage of energy of said desired frequency, a rectifier coupled to the output of said network, a second rectifier coupled to the output of said tube, and a control circuit for the device coupled to the rectifier outputs, which are so coupled that they produce opposing effects on the control circuit.

7. A system as defined in claim 6 wherein the network functions both in a negative feedback arrangement for producing selectivity and in an arrangement involving producing rectified energy in accordance with the output of the network, opposed by rectified energy produced in accordance with energy bypassed around the network.

8. A selective A. C.-D. C. amplifier-rectifier system, comprising two rectifiers with D. C. load circuits differentially connected to a common output circuit, one of said rectifiers operatively driven from a source of A. C. energy most effectively at frequencies other than the desired frequency of operation, and the other of said rectifiers being driven from said source of A. C. energy at the desired frequency of operation.

9. Selective means for producing D. C. voltage from A. C. voltage comprising two channels of transmission and rectification with different frequency characteristics, one of the channels transmitting least at the desired frequency of selective D. C. production, with the output D. C. voltage substantially proportional to the difference of the A. C. energies traversing the two channels.

10. In a selective A. C.-D. C. rectifier system, a plurality of rectifiers operatively driven from an A. C. source, with different relations between the strength of energy driving the two rectifiers and the frequency of the A. C. source, said rectifiers being differentially coupled to a common output circuit.

11. In a selective A. C.-D. C. rectifier system, two rectifiers driven from a common A. C. source through differently characterized transmission channels, with one channel transmitting least at a frequency of greatest desired response, a common output circuit differentially coupled to the outputs of the two rectifiers, and means limiting the effectiveness of the differential output of the rectifiers when it is in one algebraic sense.

12. A selective A. C.-D. C. amplifier rectifier system, comprising two rectifiers with D. C. load circuits differentially connected to a common output circuit, one of said rectifiers operatively driven from a source of A. C. energy most effectively at frequencies other than the desired frequency of operation, and the other of said rectifiers being driven from said source of A. C. energy at the desired frequency of operation, and further characterized by the common source being degeneratively operated from the energy passing through one of the rectifiers.

13. Selective means for producing D. C. voltage from A. C. voltage comprising two channels of transmission and rectification with different frequency characteristics, one of the channels transmitting least at the desired frequency of selective D. C. production, with the output D. C. voltage substantially proportional to the difference of the A. C. energies traversing the two channels, and further characterized by the common source being degeneratively operated from the energy passing through one of the channels.

14. In a selective A. C.-D. C. rectifier system, two rectifiers driven from a common A. C. source through differently characterized transmission channels, with one channel transmitting least at a frequency of greatest desired response, a common output circuit differentially coupled to the outputs of the two rectifiers, and means limiting the effectiveness of the differential output of the rectifiers when it is in one algebraic sense, and further characterized by the common source being degeneratively operated from the energy passing through one of the channels.

ELLISON S. PURINGTON.